THOMAS E. JOHNSON.
Imprvoement in Peach-Stone Extractor.
117,892.
Patented August 8, 1871.
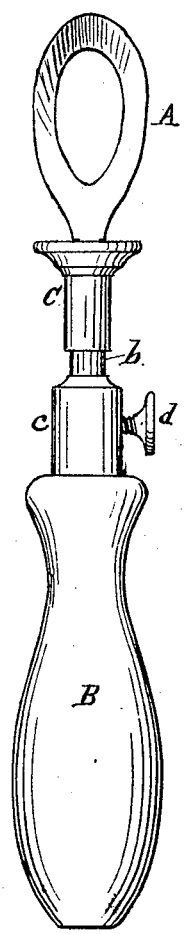
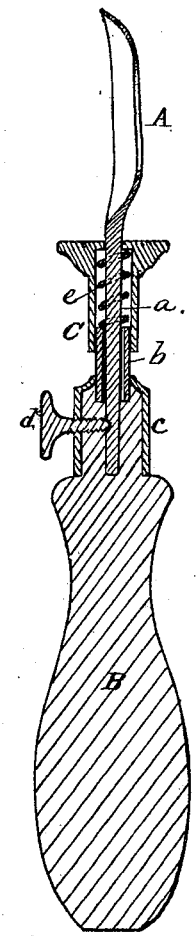
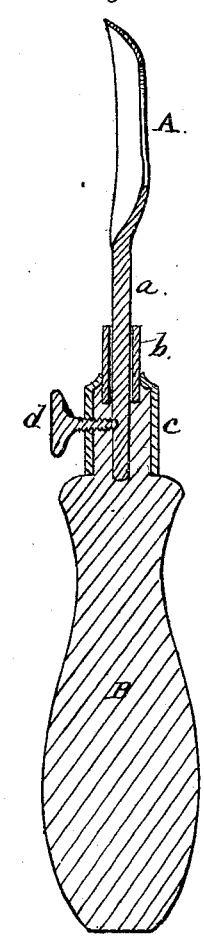
Witnesses.
Gilbert B. Fowles.
W. Burris
Inventor.
T. E. Johnson

UNITED STATES PATENT OFFICE.

THOMAS E. JOHNSON, OF INDIANAPOLIS, INDIANA.

IMPROVEMENT IN PEACH-STONE EXTRACTORS.

Specification forming part of Letters Patent No. 117,892, dated August 8, 1871.

*To all whom it may concern:*

Be it known that I, THOMAS E. JOHNSON, of Indianapolis, in the county of Marion and State of Indiana, have invented a new and useful Improvement in Devices for Extracting Seed from Peaches; and I do hereby declare that the following is a full, clear, and exact description of the construction and operation of the same, reference being had to the accompanying drawing making a part of this specification, in which—

Figure 1 is a front view of the device. Fig. 2 is a sectional view. Fig. 3 is also a sectional view, but without the automatical and adjustable guard or shield.

Like letters in the different figures of the drawing indicate like parts.

My invention consists in the combination of the socket of a handle, provided with a set-screw, with the shank of a knife of an oval or elliptical shape approximating that of a spoon, but having an opening through the bottom of it for extracting the seed from peaches, so that the knife, when dull, may be readily removed and another inserted; also, in the combination of an automatical and adjustable guard or shield with the handle and shank of the knife for protecting the hand from injury during the operation of extracting the seed from the peach, the guard or shield being constructed so as to adjust itself to the size of the peach, and also affording a support or bearing for the finger to rest upon, which may or may not be used.

A is the device for extracting the seed from the peach, consisting of a knife which approximates the shape of a spoon, with a concave receptacle on the interior, having an opening through the bottom for facilitating the operation of extracting the seed from the peach, the knife being provided with the shank $a$, made to fit the socket $b$ of a metallic or wooden handle, B. If the handle be of wood, ivory, or other like material, the socket is made of a tube-like form, constituting a part of the metallic band or ring, $c$, placed over the end of the handle. The depth of the socket will be regulated according to the length of the shank of the knife. If the handle be of metal the socket should be cast or drilled in the same, and the proper hole, with screw-threads, made to receive the set-screw. The shank of the handle is made to fit loosely, but snugly, in the socket $a$, and is held firmly therein by the set-screw $d$, a hole of the proper size being made in the band or ring, and provided with screw-threads to receive the set-screw. By loosening the latter the knife may be easily withdrawn at any time for the purpose of sharpening the knife. Thus, in large packing establishments, it is proposed to have several knives on hand, so that when one is dull another may be readily inserted. The guard or shield C consists of a short tube or sleeve, flaring outwardly at the upper end, made to slide freely on the socket $b$, and having a spiral spring, $e$, on the interior for giving it the necessary automatical and yielding movement, and having a hole large enough in the top to admit the shank of the knife, which is passed down through the spring and thence into the socket. The guard or shield has it sliding and automatic movement on both the shank and socket, being regulated by the distance allowed between the top edge of the band or ring where the socket joins with it and a shoulder formed on the shank just where it terminates in the oval or elliptical-shaped knife. Thus it will be obvious, when it is pressed down, and the moment the pressure is removed therefrom, it will be forced up by the recoil of the spring.

The operation of this device is as follows: The handle thereof is grasped by the hand, with the finger pressing upon the guard. The knife is then inserted at the stem part of the peach on each side of the stone, so as to loosen and easily extract it, which operation is very quickly performed, the guard or shield protecting the hand holding the peach from the liability of injury by the knife being forced through the same, the guard adjusting itself automatically to the size of the peach.

Having fully described my invention, what I claim therein as new, and desire to secure by Letters Patent, is—

1. The knife A having shank $a$, in combination with handle B, socket $b$, and set-screw $d$, either with or without the automatic and adjustable guard C, substantially as shown, and for the purpose set forth.

2. The construction and arrangement of the automatic and adjustable guard C, spring $e$, socket $b$ with metallic band or ring $c$ of handle B, shank $a$, and knife A, all as shown and described.

T. E. JOHNSON.

Witnesses:
WM. H. HELMICK,
GILBERT B. TOWLES.